United States Patent [19]

Leibrand, Sr.

[11] Patent Number: 4,612,896
[45] Date of Patent: Sep. 23, 1986

[54] DIESEL FUEL HEATER

[75] Inventor: John G. Leibrand, Sr., Adelanto, Calif.

[73] Assignee: "A" Co., Riverton, Wyo.

[21] Appl. No.: 772,263

[22] Filed: Sep. 3, 1985

[51] Int. Cl.$^4$ ............................................. F02M 31/00
[52] U.S. Cl. .................................................... 123/557
[58] Field of Search ........................... 123/557, 558, 3; 165/52, 51

[56] References Cited

U.S. PATENT DOCUMENTS

| | | |
|---|---|---|
| 439,855 | 3/1893 | Bennett . |
| 1,107,967 | 8/1914 | Knaak . |
| 1,148,892 | 8/1915 | Dixon . |
| 2,680,692 | 6/1954 | Robinson . |
| 4,068,638 | 1/1978 | Butler ................................. 123/557 |
| 4,326,492 | 4/1982 | Leibrand . |
| 4,343,283 | 8/1982 | Shepherd ............................ 123/557 |
| 4,364,365 | 12/1982 | Gendron . |
| 4,454,841 | 6/1984 | Reinhard . |
| 4,499,886 | 2/1985 | Hinds .................................. 123/557 |

Primary Examiner—Ronald H. Lazarus
Attorney, Agent, or Firm—Lewis E. Massie

[57] ABSTRACT

An apparatus for heating the fuel for an internal combustion diesel engine using the heat from the exhaust conduit. A fuel line wound helically around the engine exhaust conduit and spaced radially therefrom is contained in a canister substantially filled a heat conducting and heat regulating mixture of fire brick pellets and pellets of the platinized material used in automobile exhaust gas catalytic converters.

5 Claims, 2 Drawing Figures

DIESEL FUEL HEATER

BACKGROUND OF THE INVENTION

1. Field of the Invention

The present invention relates to heat transfer and more particularly to the method and apparatus used to heat the fuel for a diesel internal combustion engine to prevent fuel system blockage in cold weather due to crystalization in, or separation of wax from, the fuel.

2. Description of Related Art

Characterizing the closest prior art of which the applicant is aware and in compliance with 37 C.F.R. S 1.97 and S 1.98 attention is invited to the following U.S. Pat. Nos.

Bennett: 493,855; Mar. 21, 1893
Knaak: 1,107,967; Aug. 18, 1914
Dixon: 1,148,892; Aug. 3, 1915
Robinson: 2,680,692; June 8, 1954
Gendron: 4,364,365; Dec. 21, 1982
Leibrand: 4,326,492; Apr. 27, 1982
Reinhard: 4,454,841; June 19, 1984

The Bennet U.S. Pat. No. 493,855 is believed relevant in its disclosure of fire brick as a heat transfer medium.

The Knaak U.S. Pat. No. 1,107,967 is believed relevant in its disclosure of asbestos as a heat retaining medium.

The Dixon U.S. Pat. No. 1,148,892 is believed relevant in its disclosure of metallic particles as a heat transfer medium.

The Robinson U.S. Pat. No. 2,680,692 is believed relevant in its disclosure of stabilized alumina heat exchange pellets as a heat transfer medium.

The Gendron U.S. Pat. No. 4,364,365 is believed relevant in its disclosure of charcoal as a heat transfer medium.

The Leibrand U.S. Pat. No. 4,326,492 is believed relevant in its disclosure of oil as a heat transfer medium.

The Reinhard U.S. Pat. No. 4,454,841 is believed relevant in its disclosure of metallic particles as a heat transfer medium.

Diesel fuel must be maintained above approximately 60 degrees F. (15.6 C.) to prevent wax formation. It is also necessary to prevent the temperature from rising substantially above 100 degrees F. (37.7 C.) to prevent deterioration of the fuel.

The use of a heat exchanger to transfer heat from the engine exhaust is well known. Prior art devices have used a coil of metallic tubing wound tightly around the exhaust conduit through which the exhaust gasses flow or by spacing the coil at some distance and using a heat transfer medium such as air, oil, charcoal, alumina, metal foils or particles, to transfer the heat to the fuel coil.

A recent patent teaches the use of oil as a heat transfer medium. Apparatus based upon this patent have been produced and marketed. The apparatus has been effective in raising the fuel temperature to an acceptable degree but heat transfer at the higher temperatures is sometimes excessive. A serious threat has developed due to oil leaking from the apparatus for fire damage. The plurality of tube fastenings coupled with seam failure in the container in an environment of thermal shock and mechanical vibation are major contibutors to oil leakage.

SUMMARY OF THE INVENTION

There is disclosed herein a new and improved medium for conducting heat from the exhaust conduit into the engine fuel. In addition to transfering heat the new medium has the property of regulating the amount of heat being transfered.

Heat transfer depends mainly uon the coefficient of heat transfer "K." and the mass and cross sectional are of the transfer medium. The heat transfer medium must also transfer the heat from the high temperature exhaust conduit to the fuel in such a way that the latter never becomes overheated. The high temperature mass of the heat transfer medium transfered to the fuel line will restrict the maximum temperature conducted as a function of the total heat available in the heat transfer medium.

The heat transfer medium of the instant invention uses a mixture of fire brick pellets and platinized pellets, such as used in automobile exhaust catalytic converters, properly sized to control the amount of air in the medium. The dry medium eliminates the hazard of leaking oil and greatly simplifies the installation of the heat exchanger on the exhaust conduit.

DESCRIPTION OF THE PREFERRED EMBODIMENT

Figure 2:
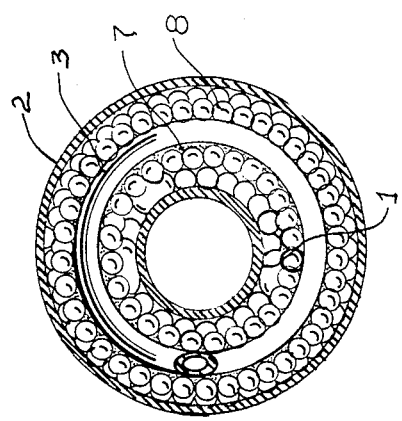
FIG. 2 is a horizontal section of the apparatus taken line 2—2 of FIG. 1.
Figure 1:
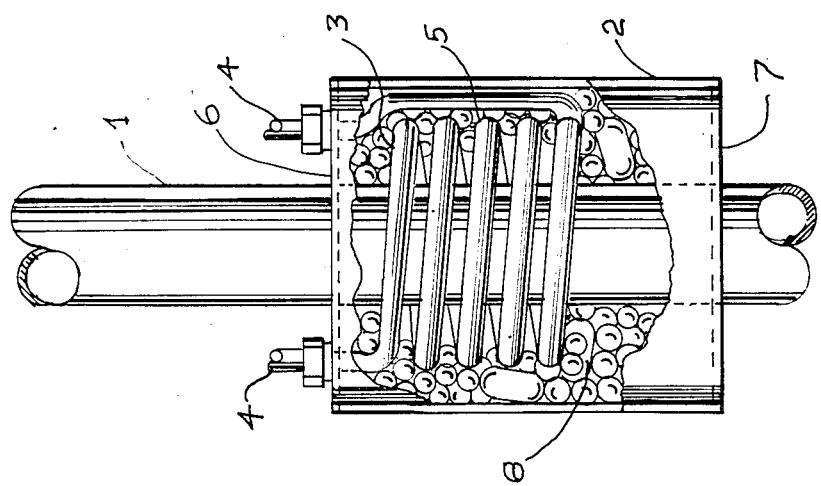
FIG. 1 is a schematic representation of the apparatus embodying the heat transfer of the present invention.

Referring now to the drawing, and to FIG. 1, in particular, there is illustrated the apparatus including a canister 5, which has a circumscribing cylindrical side wall 2 concentrically mounted upon the exhaust conduit 1, in radial spaced relation thereto. The canister is upwardly closed by an annualar planar upper end wall 6 which interconnects the side wall 2 and the exhaust conduit. The canister is downwardly closed by a lower end wall 7 which which s substantially congruent to the upper end wall and is similarly disposed in relation to the side wall and the conduit.

The upper end wall has conventional fittings connected to the fuel line 3 which extends through the wall in axially parallel relation to the exhaust conduit 1 and is spaced radially between the pipe and the side wall.

The apparatus has a fuel line 3 disposed within the canister 2. The line has a helically coiled intermediate portion 5 which is at all points spaced from the exhaust conduit. The coil substantially coaxially aligned with the exhaust conduit and wound in circumscribing radial spaced relation about the conduit. The line is spaced at all points from the side, end, and walls of the canister 2.

The fuel line 3 is constructed of any suitable heat conductive material and is covered with a baked epoxy coating including fire brick pellets 7.

The canister is substantially filled with a thermal conductive mixture 8 of 85% fire brick pellets 6 and 15% platinized pellets of the type used in automobile exhaust gas catalysts. The fire, or refractory, brick is of the general formula $ALO.2SO.2HO$ fired at 900 decrees centigrade to 1000 degrees centigrade to increase its resistance to spalling and abraison. The crushed dense fire brick clay is tumbled or barrel milled to round of the particles then doubled screened to sort out pellets between three and ten millimeters in diameter. The platinized pellets are approximately 14 millimeters in diameter and 6 to 20 millimeters in length. This mixture of thermal conductive pellets provides the necessary cross sectional area between pellets and the amount of air to provide the proper "K" factor for the total thermal conductive mass of the heat exchange medium.

I claim:

1. In a diesel internal combustion engine fuel heater having a cylindrical canister circumferentially attached to the exhaust conduit of the diesel engine, enclosed within the canister a helically wound fuel line spaced at all points from the exhaust conduit, the top, sides, and bottom of the canister, the space between the exhaust conduit, the fuel line and the inner surfaces of the canister being substantially filled with a thermal conductive material wherein the improvements comprise:
   a. the thermal conductive mixture consisting of 85% rounded pellets of dense fire brick to 15% platinized pellets;
   b. The pellets of fire brick varying in diameter from three to ten millimeters; and,
   c. the platinized pellets being approximately 14 millimeters in diameter to 6 to 20 millimeters in length.

2. In a diesel engine fuel heater according to claim 1 wherein:
   a. the fire brick pellets having a high aluminum oxide content, including bauxite, with the general formula AlO.2SO
   b. the fire brick pellets having a porosity of 10 to 20 percent;
   c. the fire brick pellets being fired at 900 degrees C. to 1000 degrees C.;
   d. the fire brick pellets being resistant to thermally induced spalling;
   e. the fire brick pellets having a uniform low coefficient of thermal conductivity;
   f. the fire brick pellets having a high resistance to mechanical abraison; and,
   g. the fire brick pellets having a "K" factor of 3 to 6.

3. In a diesel engine fuel heater according to claim 1 wherein:
   a. the platinized pellets being of the type used in automobile engine exhaust gas catalysts.

4. In a diesel engine fuel heater according to claim 1 wherein:
   a. the fuel line being coated with a mixture of fire brick pellets coated with epoxy; and,
   b. the coated fuel line being heat treated to cure the epoxy.

5. In a diesel engine fuel heater according to claim 1 wherein:
   a. the heat exchange canister being substantially filled with the heat transfer and regulating mixture;
   b. the ratio of free space in the canister to the amount of heat transfer mixture contained therein being determined by the maximum allowable fuel temperature; and,
   c. the heat transfer medium in the canister constituting the sole conductor of heat from the exhaust conduit to the fuel line.

* * * * *